United States Patent

Lioy et al.

(10) Patent No.: US 7,542,458 B2
(45) Date of Patent: Jun. 2, 2009

(54) METHOD AND APPARATUS FOR EFFICIENTLY USING AIR-LINK RESOURCES TO MAINTAIN IP CONNECTIVITY FOR INTERMITTENTLY ACTIVE WIRELESS TERMINALS

(75) Inventors: Marcello Lioy, San Diego, CA (US); Nischal Abrol, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 789 days.

(21) Appl. No.: 10/723,568

(22) Filed: Nov. 25, 2003

(65) Prior Publication Data

US 2005/0111377 A1  May 26, 2005

(51) Int. Cl.
 *H04J 3/24* (2006.01)
(52) U.S. Cl. ............ 370/349; 370/395.3; 370/401
(58) Field of Classification Search ......... 370/349, 370/395.3, 401
See application file for complete search history.

(56) References Cited

U.S. PATENT DOCUMENTS

| | | | |
|---|---|---|---|
| 6,947,401 | B2 | 11/2001 | El-Malki et al. |
| 6,427,170 | B1* | 7/2002 | Sitaraman et al. ............ 709/226 |
| 6,618,757 | B1* | 9/2003 | Babbitt et al. ............... 709/226 |
| 7,308,495 | B2* | 12/2007 | Ishiyama et al. ............ 709/223 |
| 2003/0153325 | A1 | 8/2003 | Veerepalli et al. ........... 455/453 |
| 2004/0083306 | A1* | 4/2004 | Gloe ...................... 709/245 |
| 2004/0105420 | A1* | 6/2004 | Takeda et al. ............... 370/349 |
| 2004/0114554 | A1 | 6/2004 | Owakajima et al. | |

OTHER PUBLICATIONS

Narten, et al. Neighbor Discover for IP Version 6 (IPv6). RFC. 2461 Dec. 1998 XP15008245A 1. p. 1-94.
Narten, et al. IPv6 Stateless Address Autoconfiguration. RFC. 2462 Dec. 1998 XP15008246A 1. p. 1-26.
Rakikawal, et al. Global Connectivity for IPv6 Mobile Ad Hoc Networks. Draft-wakikawa-manet-globalv6-02.txt. Nov. 2002-Apr. 2003. XP 15005658A 1. p. i-31.
International Search Report PCT/US2004/037852 International Search Authority European Patent Office Mar. 3, 2005.
International Preliminary Report on Patentability PCT/US2004/037852, IPEA/US Apr. 13, 2006.
Written Opinion PCT/US2004/037852 International Search Authority European Patent Office Mar. 3, 2005.

* cited by examiner

*Primary Examiner*—Jason E Mattis
(74) *Attorney, Agent, or Firm*—Howard H. Seo; Darren M. Simon (57) ABSTRACT

Techniques for minimizing dormant reactivations to receive IPv6 Router Advertisements are described. In a first scheme, a timer is used to trigger a wireless terminal to solicit a Router Advertisement. The timer is set to a threshold time period computed based on the current prefix lifetime. When the timer expires, a Router Solicitation is sent. In a second scheme, after the timer expires, a Router Solicitation is sent whenever the terminal is active. In a third scheme, a Router Solicitation is sent when the timer expires if solicitation is triggered and at any time thereafter whenever the terminal is active. In a fourth scheme, two timers are set to two threshold time periods. After the first timer expires, a Router Solicitation is sent whenever the terminal is active. When the second timer expires, a Router Solicitation is sent if solicitation is triggered by a predefined event or condition regardless of the terminals state.

9 Claims, 9 Drawing Sheets

| RA Prefix | Preferred Lifetime | Valid Lifetime |
|---|---|---|
| $P_1$ | $T_{p1}$ | $T_{v1}$ |
| $P_2$ | $T_{p2}$ | $T_{v2}$ |
| ⋮ | ⋮ | ⋮ |
| $P_n$ | $T_{pn}$ | $T_{vn}$ |

METHOD AND APPARATUS FOR EFFICIENTLY USING AIR-LINK RESOURCES TO MAINTAIN IP CONNECTIVITY FOR INTERMITTENTLY ACTIVE WIRELESS TERMINALS

BACKGROUND

I. Field

The present invention relates generally to communication, and more specifically to techniques for efficiently using air-link resources to maintain IP connectivity for intermittently active wireless terminals.

II. Background

In an Internet Protocol (IP) network, a host communicates with another host via a router. In IP terminology, a "node" is a device that implements IP, a "router" is a node that forwards IP packets not explicitly addressed to itself, and a "host" is a node that is not a router. As used herein, "IP" generically refers to all versions of the Internet Protocol. A host may have one or multiple interfaces to a link. In IP terminology, a "link" is a communication facility or medium over which nodes can communicate at a link layer (which is the layer immediately below IP), and an "interface" is a node's attachment to a link. An interface may be viewed as a network communication port. Each interface is associated with one or more IP addresses that uniquely identify that interface.

Internet Protocol Version 6 (IPv6) is a version of Internet Protocol that is slated to replace the widely used Internet Protocol Version 4 (IPv4). IPv6 resolves some of the key limitations of IPv4. For example, IPv4 utilizes a 32-bit address that was originally thought to provide an ample number of addresses to uniquely identify machines connected to the Internet. However, the explosive growth of the Internet has created a real risk of running out of IPv4 addresses. IPv6 ameliorates this concern by utilizing a 128-bit address.

IPv6 also provides other improvements over IPv4. For example, IPv6 supports "stateless address autoconfiguration", which is a process whereby a host can automatically configure its own IPv6 address(es). Stateless address configuration can avoid the need to manually configure each host before connection to a network, eliminate the need for a dedicated server to administer and assign addresses to hosts on the network, and facilitate renumbering of addresses for hosts on the network.

For stateless address configuration in IPv6, an IPv6 address for an interface of a host on a link is obtained by concatenating a "prefix" for the link with an interface identifier (ID) for the interface. The interface ID is a value that uniquely identifies the interface within the link and may be derived based on an identifier assigned by the interface manufacturer. The prefix may be viewed as an address for the link and is associated with a lifetime over which the prefix is valid. The host can request prefix information (i.e., the prefix and its lifetime) by sending a Router Solicitation to routers on the link. Each router would then respond by sending back a Router Advertisement with the prefix information. Each router may also periodically broadcast the prefix information to hosts on the link via Router Advertisements. Each host continually listens for Router Advertisements from the routers to obtain updated prefix information. A host can also obtain the address of each router from the Router Advertisement sent by the router. The host can send IP packets to specific routers using the router addresses.

A wireless (e.g., cellular) communication network may support voice and data services. Data communication may be achieved by using IPv6 over the air interface protocols employed by the wireless network. A wireless terminal (a host) can establish a data session with the wireless network and communicate with a network entity (a router) in order to exchange data. The terminal may be intermittently active during the data session and may enter a dormant mode when not active in order to conserve air-link resources. In the dormant mode, the data-link connection is maintained but the air-link connection is released. This allows the terminal to quickly re-establish communication whenever data needs to be sent.

Implementing stateless address autoconfiguration in a wireless network without expending too much system resources is challenging for several reasons. First, Router Advertisements may be sent at random times and less frequently for a wireless network than for a wireline network. A wireless terminal may not know when to wake up from the dormant mode to receive a Router Advertisement and may need to remain awake for a long time in order to receive the Router Advertisement. Second, the terminal is not able to send a Router Solicitation while in the dormant mode and would have to re-establish air-link connection in order to do so. Minimizing dormant reactivation is desirable to conserve air-link resources.

There is therefore a need in the art for techniques to minimize dormant reactivations to receive IPv6 Router Advertisements.

SUMMARY

Techniques for efficiently using air-link resources to maintain IP connectivity for an intermittently active wireless terminal are described herein. These techniques reduce dormant reactivations for receiving Router Advertisements to a minimum. These techniques may be implemented in various manners. Some exemplary schemes are described below.

In a first scheme, a timer is used to trigger solicitation for a Router Advertisement. Whenever a Router Advertisement is received, a threshold time period is computed based on the lifetime of a prefix obtained from the Router Advertisement. For example, the threshold time period may be a percentage (e.g., 75%) of the prefix lifetime. The timer is set to the threshold time period when the Router Advertisement is received. When the timer expires, the terminal sends a Router Solicitation. The first scheme does not attempt to optimize air-link resources.

In a second scheme, the timer is set to the threshold time period whenever a Router Advertisement is received. After the timer expires, the terminal sends a Router Solicitation whenever it is active (i.e., not dormant). The second scheme conserves air-link resources by avoiding dormant reactivations to receive Router Advertisements.

In a third scheme, the timer is set to the threshold time period whenever a Router Advertisement is received. When the timer expires, the terminal may send a Router Solicitation if solicitation is triggered by any one of various conditions such as (1) the configuration of the terminal (e.g., an always-on data session), (2) past data activity, (3) likelihood of future data activity, (4) availability of air-link resources, and so on. The terminal can send the Router Solicitation right away if it is active. If the terminal is not active when solicitation is triggered, then the terminal can send the Router Solicitation when it becomes active. Like the second scheme, the terminal may also send a Router Solicitation if it becomes active at any time after the timer expires.

In a fourth scheme, two timers are set to two threshold time periods computed based on the prefix lifetime. After the first timer expires, the terminal sends a Router Solicitation if solicitation is triggered and when the terminal is active, similar to the third scheme. After the second timer expires, the terminal sends a Router Solicitation if solicitation is triggered, regardless of the current state of the terminal (i.e., the terminal wakes up to send the Router Advertisement if it is not active).

Other schemes may also be implemented based on the description provided herein. Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for minimizing dormant reactivations to receive Router Advertisements may be implemented in various wireless communication networks. For example, these techniques may be implemented in a Code Division Multiple Access (CDMA) communication network, a UMTS (Universal Mobile Telecommunications System) communication network, and so on. A CDMA network may implement one or more air-interface standards such as IS-95, IS-2000, IS-856 (also referred to as 1xEVDO), and so on, and one or more mobile networking protocols such as IS-41. A UMTS network may implement one or more air-interface standards such as Global System for Mobile Communications (GSM), General Packet Radio Service (GPRS), Wideband-CDMA (W-CDMA), and so on, and one or more mobile networking protocols such as GSM Mobile Application Part (GSM-MAP). These air-interface standards and mobile networking protocols are well known in the art. Different wireless networks employ different network entities and use different terminology.

Figure 1A:
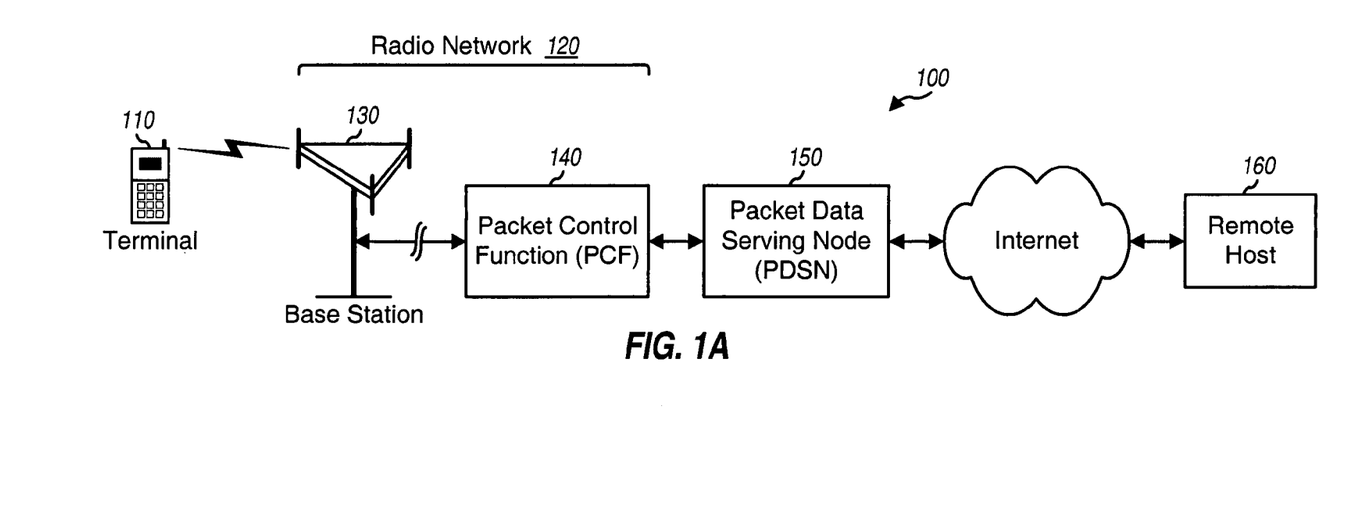
FIG. 1A shows a CDMA communication network.

FIG. 1A shows a diagram of a CDMA communication network 100, which includes network entities described by a consortium named "3rd Generation Partnership Project 2" (3GPP2). In CDMA network 100, a wireless terminal 110 communicates with a base station 130 via an air-link connection. Wireless terminal 110 may be a cellular phone or some other wireless communication device. For packet data services, base station 130 communicates with a Packet Control Function (PCF) 140, which further communicates with a Packet Data Serving Node (PDSN) 150. Base station 130 and PCF 140 are part of a radio network (RN) 120. PCF 140 is an entity in radio network 120 which controls the transmission of packets between base station 130 and PDSN 150. PDSN 150 supports packet data services for the terminals in CDMA network 100. For example, PDSN 150 is responsible for the establishment, maintenance, and termination of a PPP (Point-to-Point Protocol) session with terminal 110. PDSN 150 may also assign dynamic IP addresses to the terminals, as described below. PDSN 150 couples to the Internet and can communicate with other entities (e.g., a remote host 160) that also couple to the Internet.

Figure 1B:
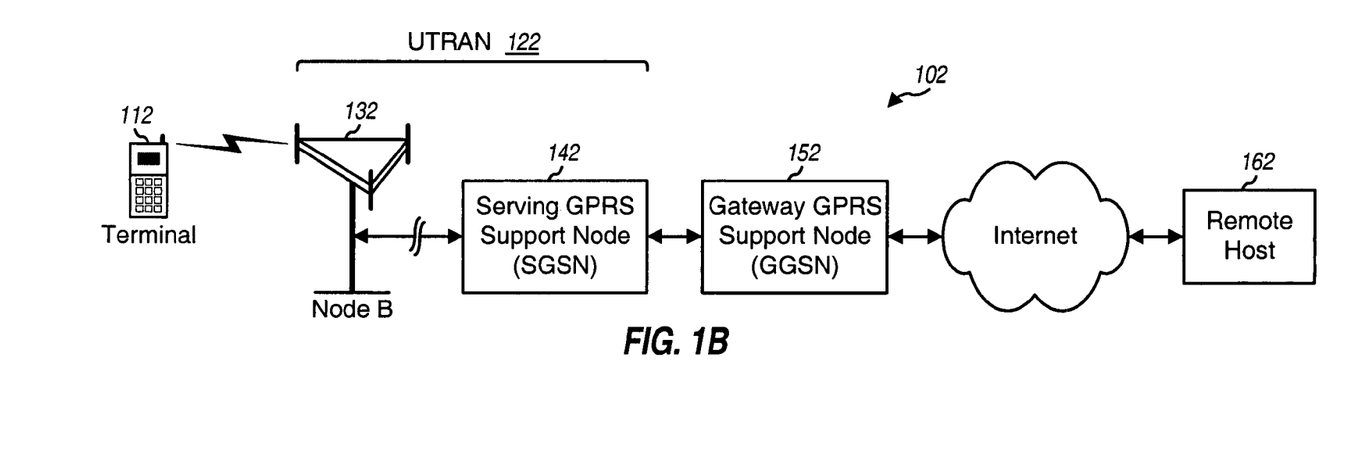
FIG. 1B shows a UMTS communication network.

FIG. 1B shows a diagram of a UMTS communication network 102, which includes network entities described by a consortium named "3rd Generation Partnership Project" (3GPP). In UMTS network 102, a wireless terminal 112 communicates with a Node B 132 via an air-link communication. For packet data services, Node B 132 communicates with a Serving GPRS Support Node (SGSN) 142, which further communicates with a Gateway GPRS Support Node (GGSN) 152. Node B 132 and SGSN 142 are part of a UMTS Terrestrial Radio Access Network (UTRAN) 122. SGSN 142 controls the transmission of packets between Node B 132 and GGSN 152. GGSN 152 supports packet data services for the terminals in UMTS network 102.

As shown in FIGS. 1A and 1B, Node B 132 in UMTS network 102 corresponds to base station 130 in CDMA network 100, SGSN 142 corresponds to PCF 140, UTRAN 122 corresponds to radio network 120, and GGSN 152 corresponds to PDSN 150. PDSN 150 and GGSN 152 support the edge routing function of their respective networks. To external packet data networks, PDSN 150 and GGSN 152 perform the tasks of IP routers.

The techniques described herein may also be implemented in other wireless communication networks. For clarity, these techniques are specifically described below for CDMA network 100.

Figure 2:
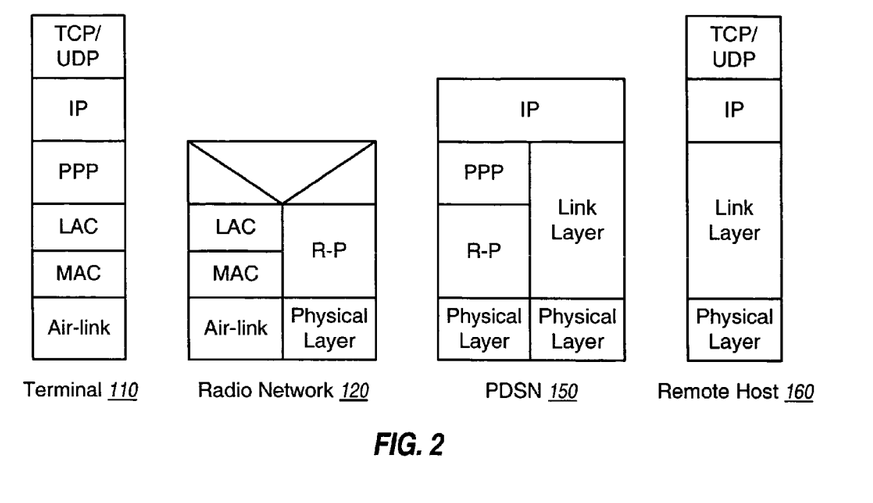
FIG. 2 shows a protocol stack for a data session between a wireless terminal and a remote host.

FIG. 2 shows a protocol stack for a data session between wireless terminal 110 in CDMA network 100 and remote host 160. Terminal 110 and remote host 160 may communicate via a transport layer, which may be implemented with Transmission Control Protocol (TCP), User Datagram Protocol (UDP), or some other protocol. TCP and UDP are well known in the art. The transport layer operates on top of a network layer, which is implemented with IP. Transport layer data is encapsulated in IP packets that are exchanged between terminal 110 and remote host 160 via PDSN 150. With IP, which is a connectionless protocol, each IP packet travels independently from the source node until it arrives at the destination node. IPv4 is described in RFC961, entitled "Internet Protocol DARPA Internet Program Protocol Specification," September 1981, and IPv6 is described in RFC2460, entitled "Internet Protocol, Version 6 (IPv6) Specification," December 1998. The network layer operates on top of a data link layer, which may be implemented with PPP or some other protocol. Terminal 10 may maintain a PPP session with PDSN 150 for the data session. PPP is described in RFC1661, entitled "The Point-to-Point Protocol (PPP)," July 1994.

For data exchange, terminal 110 communicates with radio network 120 via a Link Access Control (LAC) protocol and a Media Access Control (MAC) protocol that operate on top of an air-link protocol. These protocols are described by the particular air-interface standards implemented by radio network 120 (e.g., IS-95, IS-2000, and/or IS-856). Radio network 120 communicates with PDSN 150 via a radio network-PDSN (or simply, "R-P") interface that operates on top of a physical layer. The R-P interface is described in IS-41, which is publicly available. PDSN 150 communicates with remote host 160 via IP over a link layer and a physical layer.

Figure 3:
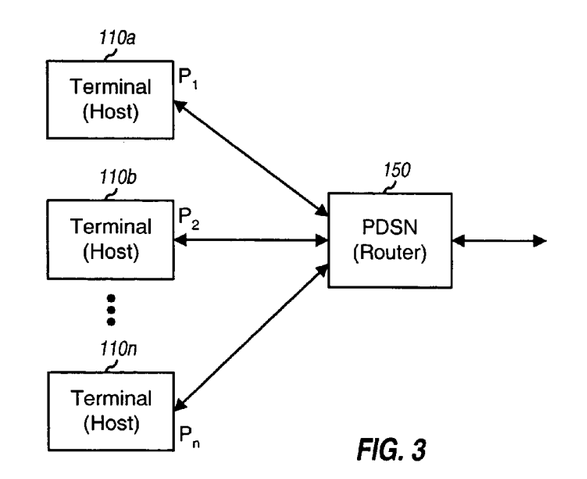
FIG. 3 shows a logical view of the CDMA network at the network layer.

FIG. 3 shows a logical view of CDMA network 100 at the network layer. Wireless terminals 110a through 110n in CDMA network 100 are referred to as hosts at the network layer, and PDSN 150 is referred to as a router. Wireless terminals 110 (hosts) communicate with each other via PDSN 150 (router) and may further communicate with remote hosts via the PDSN. Wireless terminals 110 and PDSN 150 belong to the same link (e.g., a PPP link), and remote hosts are external to this link.

In IPv6, a host may communicate with other nodes on the same link using a "link-local address" that is unique to that host for that link. Link-local addresses have link-only scope and only need to be unique within the link. A router does not forward an IP packet outside of the link if the IP packet contains a link-local address for the destination address. A host within the link may communicate with other hosts external to the link using a global address that has unlimited scope. Unique addresses are needed at the link and global levels to ensure that IP packets are sent to the proper destination nodes.

Figure 4:
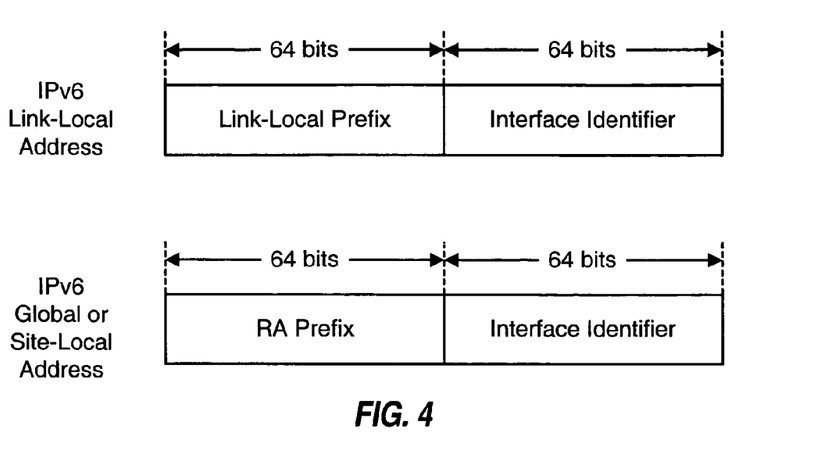
FIG. 4 shows the formats for link-local and global addresses in IPv6.

FIG. 4 shows the formats for a link-local address and a global address in IPv6. The link-local address is composed of a link-local prefix and an interface ID. An IPv6 address is 128-bit wide, but there are no specific requirements for the widths of the prefix and the interface ID. The link-local prefix is known a priori by hosts and has a predefined value of FE80::0, where FE80 are the four most significant hexadecimal digits and all remaining hexadecimal digits are zero. In a typical implementation, the interface ID is a 64-bit value and the prefix is also a 64-bit value. In this case, the link-local prefix is FE80 followed by 12 hexadecimal digits of zero.

For a wireline network, the interface ID is unique to the host (or more specifically, unique to the interface) on the link and may be obtained based on a unique number assigned by the manufacturer. For example, the interface ID may be generated based on a 48-bit Ethernet address assigned to the interface. For a UMTS network, the interface ID is assigned by the network to the wireless terminal during PDP context activation, which is the signaling to establish a packet data call. For a CDMA network, the interface ID may be configured during PPP negotiation.

The global address is composed of an RA prefix and the interface ID. For a wireline network, a host may request RA prefixes by sending a Router Solicitation to all routers in the link. Each router then responds with a Router Advertisement containing prefix information (i.e., RA prefixes and their lifetimes) for that router. Each router will typically broadcast Router Advertisements periodically to all hosts on the link.

For a wireless network, a wireless terminal is assigned one or more unique IP addresses for use in a data session. For IPv4, the wireless network assigns a unique IPv4 address to the terminal for the data session. For IPv6, the wireless network may assign one or more unique RA prefixes to the terminal, where each RA prefix is associated with a lifetime. The terminal can generate a unique IPv6 address based on each assigned RA prefix. Referring back to FIG. 3, wireless terminals 110a through 110n are assigned RA prefixes of $P_1$ through $P_n$, respectively, by the wireless network.

Figure 5:
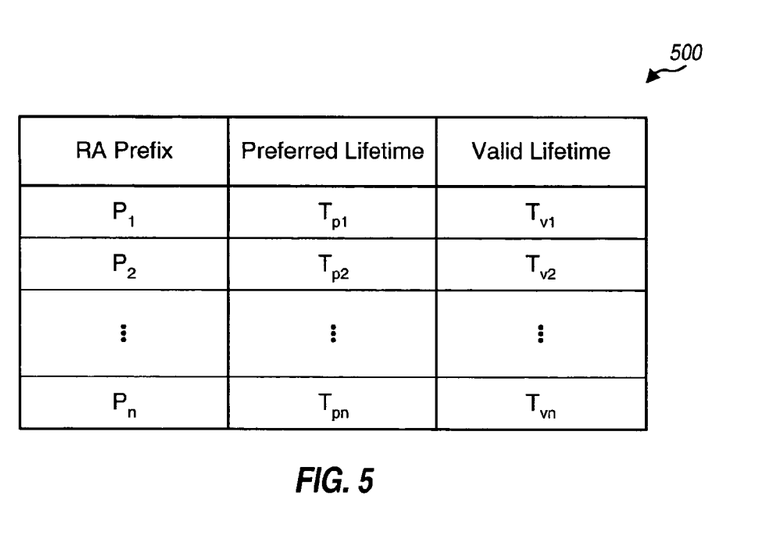
FIG. 5 shows a prefix table maintained by a PDSN in the CDMA network.

FIG. 5 shows a prefix table 500 that may be maintained by the PDSN for RA prefixes assigned to wireless terminals. In this example, table 500 includes three columns for RA prefix, preferred lifetime, and valid lifetime. Table 500 also includes one entry for each RA prefix that has been assigned to a terminal. In IPv6, each RA prefix is associated with a preferred lifetime and a valid lifetime. An RA prefix and its lifetimes may be sent to a terminal via a Router Advertisement. An assigned RA prefix and its preferred and valid lifetimes are stored as one entry in table 500.

As noted above, an IPv6 address may be generated by combining an RA prefix with an interface ID. This IPv6 address is a "preferred" address until the preferred lifetime expires. The IPv6 address becomes a "deprecated" address during the time period between the preferred lifetime and the valid lifetime. Preferred and deprecated addresses are "valid" addresses that may be used for communication, but only preferred addresses should be used when initiating new communications. A valid address becomes an "invalid" address when the valid lifetime expires. An invalid address cannot be used for any communication.

Figure 6:
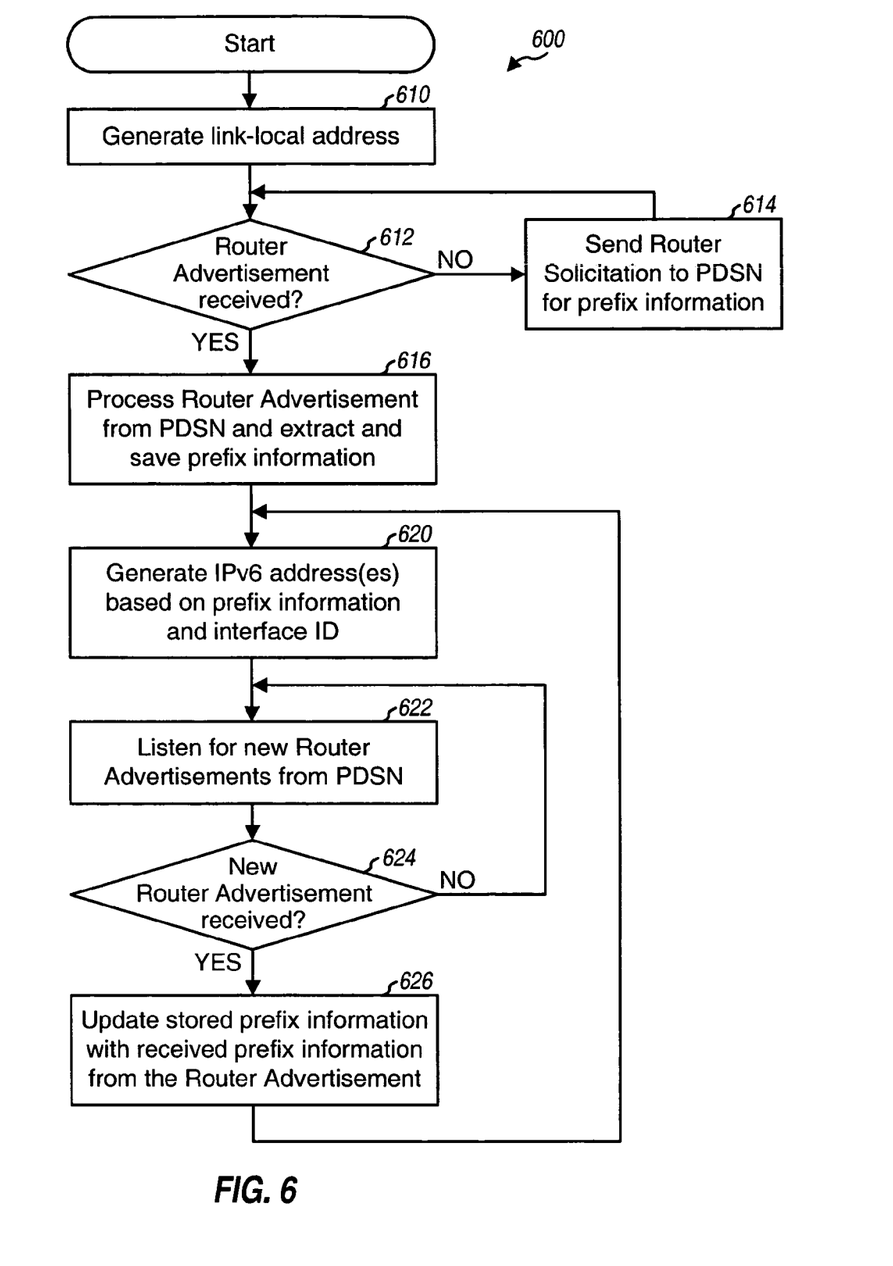
FIG. 6 shows a process to generate IPv6 addresses by the wireless terminal.

FIG. 6 shows a flow diagram of a process 600 to generate IPv6 addresses by a wireless terminal. At the start of a data session, the terminal generates a link-local address based on the known link-local prefix and an interface ID, which may be assigned by, or negotiated with, the wireless network (step 610). A determination is then made whether or not the terminal received a Router Advertisement from the network (step 612). For the CDMA network, the PDSN sends a Router Advertisement as part of the data call setup. If the terminal does not receive a Router Advertisement after a particular amount of time has elapsed or if the wireless network does not automatically send the Router Advertisement (i.e., the answer is 'no' for step 612), then the terminal can send a Router Solicitation to the PDSN (step 614) and then return to step 612. The terminal typically waits for a time period before sending the next solicitation for Router Advertisement, which is not shown in FIG. 6 for simplicity.

If the terminal received a Router Advertisement from the PDSN in step 612, then the terminal processes the Router Advertisement, extracts the prefix information from the Router Advertisement, and saves the prefix information (step 616). The prefix information includes one or more RA prefixes assigned to the terminal by the wireless network and the preferred and valid lifetimes for each RA prefix. Typically, only one RA prefix is assigned to each terminal. However, multiple RA prefixes may be assigned for various reasons (e.g., RA prefixes with different lifetimes may be assigned to the terminal). The terminal can generate an IPv6 address with each RA prefix and the interface ID (step 620). The IPv6 address(es) may be used for communication with other terminals and remote hosts.

The terminal thereafter listens for new Router Advertisements sent by the PDSN (step 622). The PDSN periodically sends Router Advertisements to all terminals using an all-nodes multicast address. The PDSN also sends a Router Advertisement to a specific terminal using a unicast address of the terminal upon receiving a solicitation from the terminal. If a new Router Advertisement is not received, as determined in step 624, then the terminal returns to step 622. The terminal loops between steps 622 and 624 until a new Router Advertisement is received or after some predetermined amount of time has elapsed. If a new Router Advertisement is received, as determined in step 624, then the terminal extracts the prefix information from the new Router Advertisement and updates the stored prefix information with the received prefix information, as described below (step 626). The terminal then returns to step 620 to update the IPv6 addresses, if necessary, based on the updated prefix information.

As shown in FIG. 6, a wireless terminal may continually listen for Router Advertisements for updated prefix information. For each Router Advertisement received from the wireless network, the terminal determines if the Router Advertisement includes any Prefix-Information option. Each Prefix-Information option includes an RA prefix and its associated lifetimes. For each Prefix-Information option, the terminal (1) stores the received RA prefix and its associated lifetimes, if this RA prefix is a new RA prefix that is not already stored by the terminal or (2) updates the lifetimes of the received RA prefix to reflect the new advertisement, if this RA prefix is already stored by the terminal. Thus, the received prefix information does not obsolete the stored prefix information.

Updating the prefix information from Router Advertisements may be straightforward for a host that is connected at all times but is challenging for a wireless terminal that is intermittently connected. The terminal may establish a data session with the PDSN, open a data-link layer connection (e.g., a PPP session) with the PDSN, and communicate with the radio network whenever there is data to exchange. During the time between data exchanges, the terminal may enter a dormant mode in which the data-link connection is maintained but the air-link connection with the radio network is released. The terminal may also enter the dormant mode whenever it moves out of coverage of the radio network. In any case, the dormant mode allows the terminal to maintain IP connectivity while conserving air-link resources. With IP connectivity, applications in higher layers behave as if the terminal has a data connection and are not (and need not be) aware of the release of the underlying air-link connection. While in the dormant mode, the terminal is not able to receive Router Advertisements sent by the PDSN and would not be able to update the prefix information. The PDSN can force the terminal to become active in order to deliver a Router Advertisement. However, this is not desirable as it consumes air-link resources for "overhead" messages.

The techniques described herein may be used for a wireless terminal that is intermittently connected. These techniques may be implemented in various manners. Some exemplary schemes are described below. In the following description, "lifetime" can refer to the preferred lifetime or the valid lifetime, depending on the desired implementation.

Figure 7A:
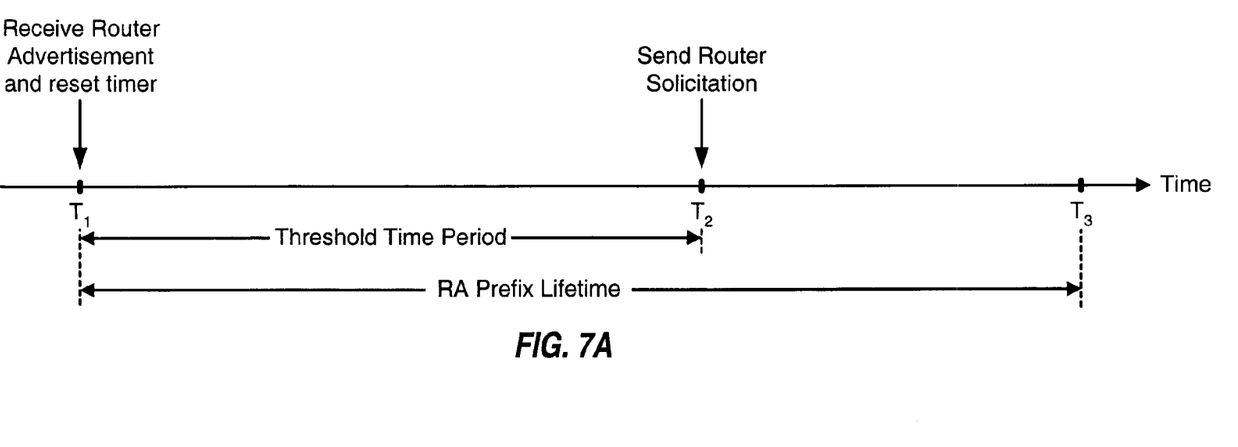
FIGS. 7A through 7D show four schemes for maintaining IP connectivity for an intermittently active terminal.

FIG. 7A illustrates a first scheme for maintaining IP connectivity for an intermittently active terminal based on a timer and a threshold time period. The timer is used to trigger a solicitation for a Router Advertisement prior to expiration of the lifetime of the current RA prefix. The threshold time period is shorter than the current RA prefix lifetime and may be computed based on a formula. For example, the threshold time period may be a particular percentage (e.g., 75%) of the lifetime, the lifetime minus a fixed amount of time (e.g., 10 minutes), and so on. The threshold time period may also be configurable. For example, the formula and/or its parameter values (e.g., the percentage value) may be preconfigured in or sent to the terminal during data call setup and/or may be adjusted during the data session. Whenever a Router Advertisement is received, the threshold time period is computed based on the lifetime obtained from the Router Advertisement, and the timer is set to the threshold time period at time $T_1$.

For the first scheme, the terminal solicits a Router Advertisement when the timer expires at time $T_2$ by sending a Router Solicitation. If the terminal is active at this time, then it can easily send the Router Solicitation. If the terminal is not active at this time, then it goes active to initiate a call to the radio network to re-establish the air-link connection and then sends the Router Solicitation. In any case, after sending the Router Solicitation, the terminal waits for a Router Advertisement from the PDSN. Upon receiving the Router Advertisement, the terminal computes the new threshold time period based on the lifetime included in the received Router Advertisement and resets the timer with the new threshold time period. Since the lifetime can change from Router Advertisement to Router Advertisement, the threshold time period can also change correspondingly.

The first scheme ensures that the terminal maintains IP connectivity even if the terminal goes in and out of dormancy during the lifetime of the RA prefix. If the prefix lifetime is sufficiently long (e.g., few hours or more) and if the threshold time period is set toward the end of the lifetime, then only small amounts of air-link resources may be needed to maintain IP connectivity for the terminal.

Figure 7B:
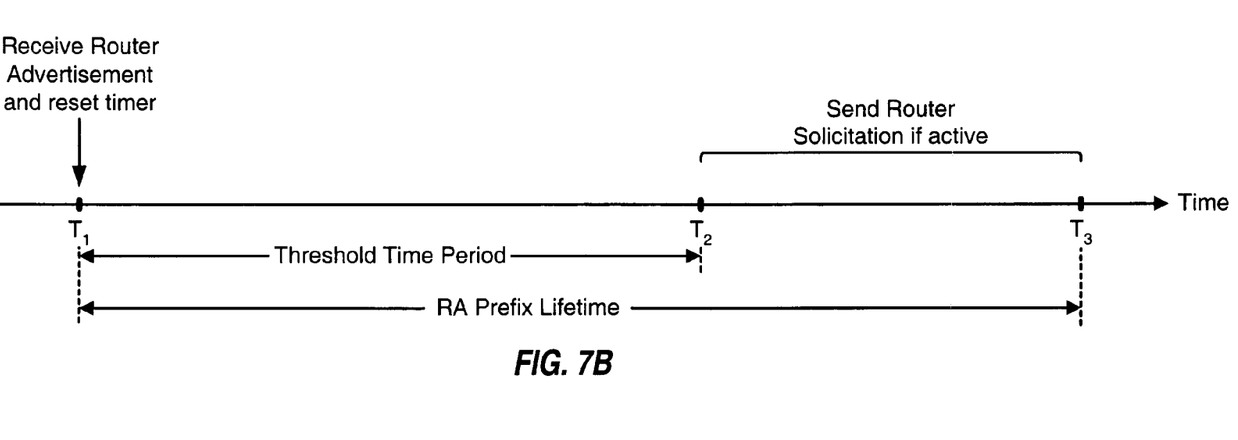

FIG. 7B illustrates a second scheme for maintaining IP connectivity for an intermittently active terminal based on a timer, a threshold time period, and an operating mode of the terminal. The second scheme avoids dormant reactivations to receive Router Advertisements. Whenever a Router Advertisement is received, the threshold time period is computed based on the lifetime obtained from the Router Advertisement, and the timer is set to the threshold time period at time $T_1$, as described above.

For the second scheme, the terminal solicits a Router Advertisement whenever it is active (i.e., not dormant) after the threshold timer expires. When the timer expires at time $T_2$, the terminal sends a Router Solicitation if it is active at this time. The terminal can also send a Router Solicitation if it becomes active at any time after time $T_2$ and before the expiration of the RA prefix lifetime at time $T_3$. The terminal typically becomes active when it has data to send, when it receives data from the wireless network, and so on. If the Router Solicitation is sent, then the terminal waits for a Router Advertisement. Upon receiving the Router Advertisement, the terminal computes the new threshold time period based on the lifetime included in the Router Advertisement and resets the timer to the new threshold time period.

Figure 7C:
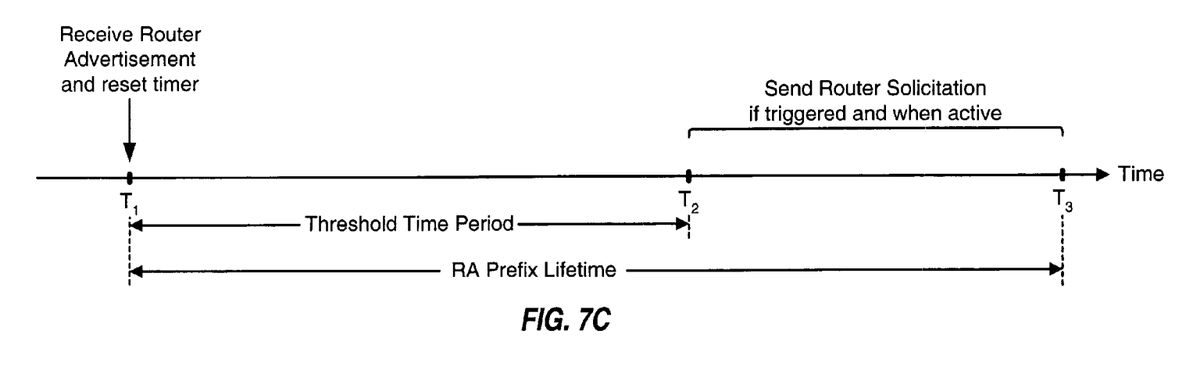

FIG. 7C illustrates a third scheme for maintaining IP connectivity for an intermittently active terminal based on a timer, a threshold time period, and a solicitation trigger. The third scheme minimizes dormant reactivations for Router Advertisements. Whenever a Router Advertisement is received, the threshold time period is computed based on the lifetime obtained from the Router Advertisement, and the timer is set to the threshold time period, as described above.

For the third scheme, the terminal solicits a Router Advertisement after the timer expires at time $T_2$ if solicitation is triggered and when the terminal is active. The solicitation may be triggered by various conditions such as the configuration of the terminal, past data activity, likelihood of future data activity, availability of air-link resources, and so on, as described below. In general, the solicitation trigger may occur at any time.

The terminal may be triggered to send a Router Solicitation if the terminal is configured with an always-on data session. The always-on configuration may be associated with a premium service.

The terminal may be triggered to send a Router Solicitation if there has been data activity during the threshold time period or some other time period.

The terminal may be triggered to send a Router Solicitation when the timer expires if there is likelihood of future data activity. This likelihood may be determined based on various factors such as the configuration of the terminal (e.g., an always-on terminal may be more likely to send data), past data activity (e.g., recent data activity may be indicative of future data activity), user input (e.g., a user may indicate a preference to stay connected), and so on.

The terminal may be triggered to send a Router Solicitation if air-link resources are readily available. The network may signal or broadcast the availability of air-link resources. The terminal may also unilaterally ascertain the availability of air-link resources. For example, air-link resources are less scarce during evenings and weekends. The terminal may then be triggered to send the Router Solicitation during evenings and weekends.

If solicitation is triggered and the terminal is active, then the terminal can send a Router Solicitation right away. Otherwise, the terminal can store the solicitation trigger and send a Router Solicitation when the terminal goes active. The terminal can also send the Router Solicitation if it becomes active at any time after the expiration of the timer at time $T_2$ and prior to the expiration of the RA prefix lifetime at time $T_3$, similar to the second scheme.

Figure 7D:
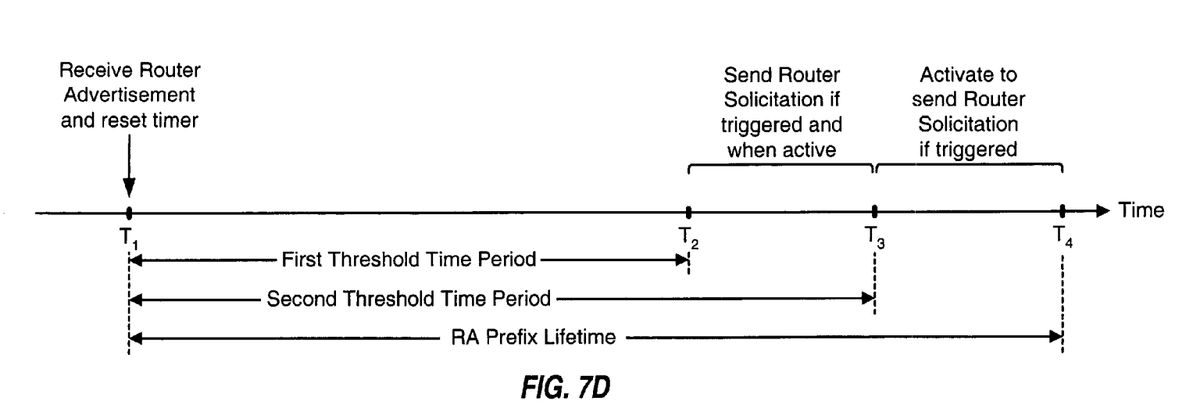

FIG. 7D illustrates a fourth scheme for maintaining IP connectivity for an intermittently active terminal based on two timers and two threshold time periods. The terminal sends a Router Advertisement after the first timer expires if solicitation is triggered and when the terminal is active. The terminal sends a Router Advertisement after the second timer expires if solicitation is triggered, regardless of the current state of the terminal.

The first and second threshold time periods are shorter than the lifetime of the current RA prefix. The first threshold time period may be equal to a particular percentage of the lifetime, the lifetime minus a fixed amount of time, and so on. The second threshold time period is longer than the first threshold time period. For example, the second threshold time period may be a percentage of the time period between the expiration of the first timer and the expiration of the lifetime, the lifetime minus a fixed amount of time, and so on.

Whenever a Router Advertisement is received, the first and second threshold time periods are computed based on the lifetime obtained from the Router Advertisement. The first and second timers are then set to the first and second threshold time periods, respectively, at time $T_1$. After the first timer expires at time $T_2$, the terminal sends a Router Solicitation if solicitation is triggered and when the terminal is active, similar to the third scheme. If the terminal sends the Router Solicitation, then it waits for a Router Advertisement. Upon receiving the Router Advertisement, the terminal computes new threshold time periods based on the lifetime included in the Router Advertisement and resets both timers with the new threshold time periods.

After the second timer expires at time $T_3$, the terminal sends a Router Solicitation if solicitation is triggered. If the terminal is not active when solicitation is triggered after time $T_3$, then the terminal activates in order to send the Router Advertisement.

The terminal can also send a Router Solicitation any time after time $T_2$ if it becomes active, similar to the second and third schemes.

Figure 8:
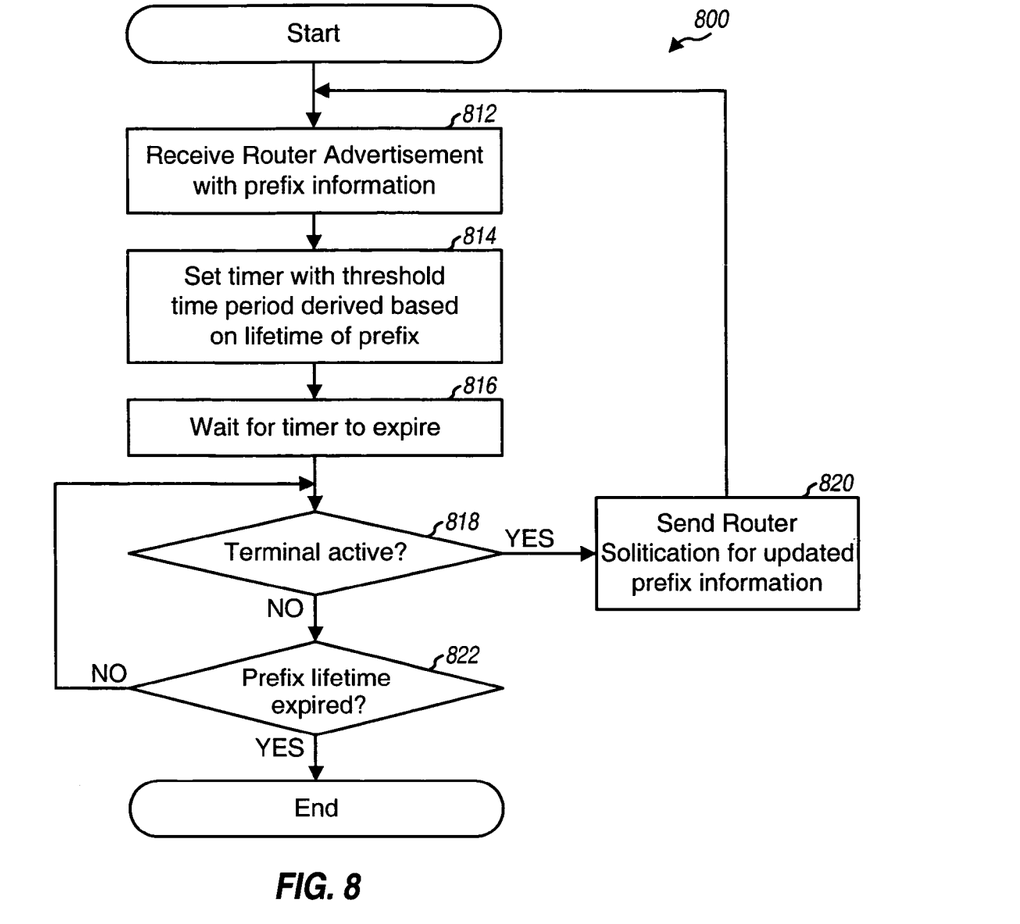
FIG. 8 shows a process for implementing the second scheme in FIG. 7B.

FIG. 8 shows a flow diagram of a process 800 for the second scheme. Initially, at time $T_1$, the terminal receives a Router Advertisement with prefix information, which includes an RA prefix and its lifetime (step 812). The terminal then computes the threshold time period based on the RA prefix lifetime and sets the timer with the threshold time period (step 814). The terminal next waits for the timer to expire, which is typically performed as a background task that does not consume much resource of the terminal (step 816).

After the timer expires at time $T_2$, a determination is periodically made whether or not the terminal is active (step 818). Step 818 may be implemented with an interrupt mechanism. If the answer is 'yes' for step 818, then the terminal sends a Router Solicitation (step 820) and then returns to step 812. Otherwise, if the answer is 'no' for step 818, then a determination is made whether or not the RA prefix lifetime has expired (step 822). The process returns to step 818 if the answer is 'no' for step 822 and terminates if the answer is 'yes'.

For the second scheme, the terminal delays sending the Router Solicitation until it becomes active (e.g., because there is data to exchange). The terminal does not go active just to send the Router Solicitation. The second scheme can provide several benefits. First, the terminal re-establishes air-link connection, e.g., when there is data to send and not for administrative tasks such as soliciting for a Router Advertisement. Second, the terminal does not inadvertently interfere with mechanisms employed by the wireless network to reclaim data-link resources (e.g., PPP state) for terminals not configured to always maintain IP connectivity. For example, the wireless network may employ an inactivity timer to reclaim resources (e.g., PPP state) from such a terminal after a long period of inactivity. This inactivity timer may be reset each time the terminal sends a Router Solicitation. The PPP session may then be maintained longer than intended. By sending a Router Solicitation only when active, the terminal does not inadvertently interfere with the inactivity timeouts.

Figure 9:
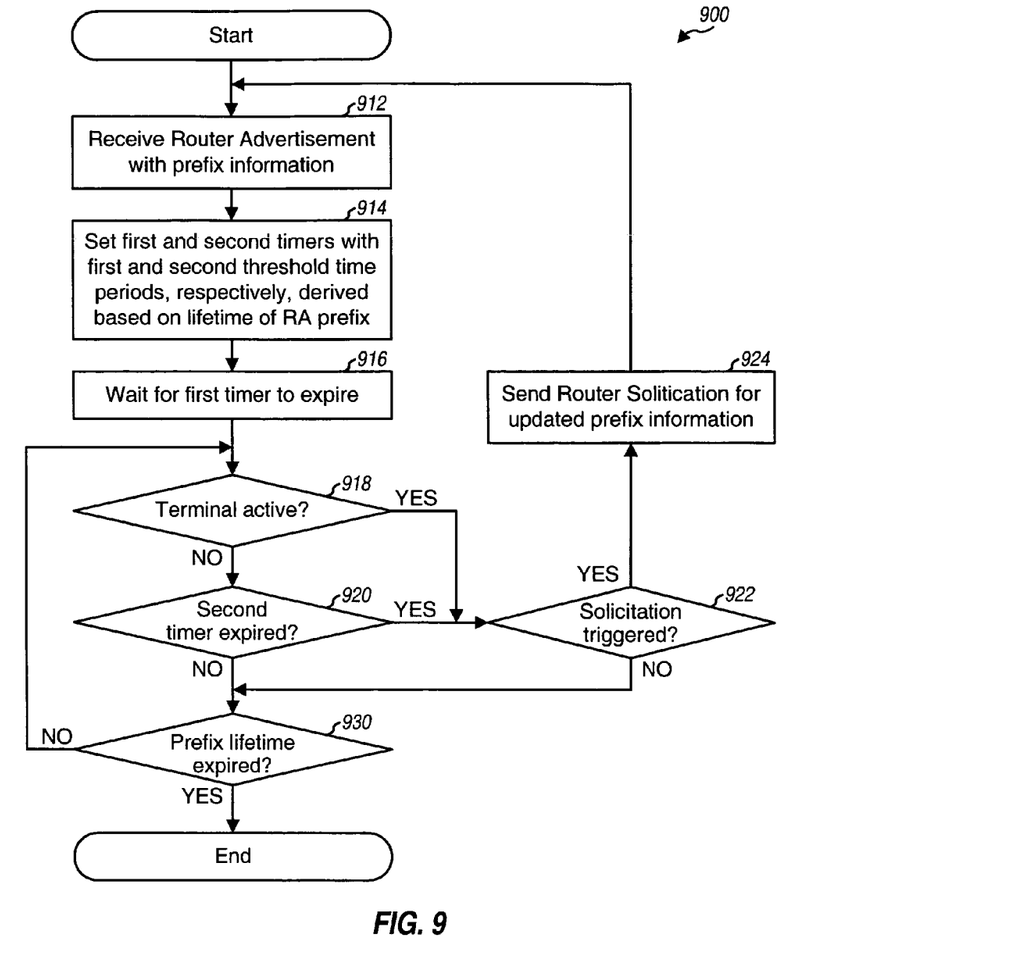
FIG. 9 shows a process for implementing the fourth scheme in FIG. 7D.

FIG. 9 shows a flow diagram of a process 900 for the fourth scheme. Initially, at time $T_1$, the terminal receives a Router Advertisement with prefix information, which includes an RA prefix and its lifetime (step 912). The terminal then computes the first and second threshold time periods based on the RA prefix lifetime and sets the first and second timers with the first and second threshold time periods, respectively (step 914). The terminal next waits for the first timer to expire (step 916). After the first timer expires at time $T_2$, a determination is periodically made whether or not the terminal is active (step 918). If the answer is 'yes' for step 918, then a determination is made whether or not solicitation for a Router Advertisement is triggered (step 922). If the answer is 'no', then the process proceeds to step 930. Otherwise, if the answer is 'yes' for step 922, then the terminal sends a Router Solicitation (step 924) and then returns to step 912 to receive a Router Advertisement.

If the answer is 'no' for step 918, then a determination is made whether or not the second timer has expired (step 920). If the answer is 'yes' for step 920, then a determination is made whether or not solicitation for a Router Advertisement is triggered (step 922). If the answer is 'yes' for step 922 and the terminal is not active, then the terminal re-establishes air-link connection. In any case, the terminal sends a Router Solicitation at step 924 if the answer is 'yes' for step 922 and proceeds to step 930 if the answer is 'no'.

If the answer is 'no' for step 920 or 922, then a determination is made whether or not the RA prefix lifetime has expired (step 930). The process returns to step 918 if the answer is 'no' for step 930 and terminates if the answer is 'yes'.

For the four schemes described above, the terminal effectively stores a solicitation and sends it at a future time, which may be when a timer expires, when the terminal becomes active, or when solicitation is triggered based on a condition.

In general, any number of timers and any number of threshold time periods may be used, and this is within the scope of the invention. The threshold time periods are computed based on the lifetime of the RA prefix obtained from a Router Advertisement. Each timer may be set to a respective threshold time period when the Router Advertisement is received. Each timer may also be associated with a respective condition or mechanism for triggering a solicitation for a Router Advertisement.

As a specific example, a design with four timers for four triggering conditions/mechanisms may be implemented as follows. The first and earliest timer may be associated with the operating mode of the terminal. A Router Solicitation may be sent when the first timer expires if the terminal is active at this time. The second and next timer may be associated with the configuration of the terminal. A Router Solicitation may be sent when the second timer expires if the terminal is configured with an always-on data session. The third and next timer may be associated with past data activity. A Router Solicitation may be sent when the third timer expires if there has been data activity since the time when the timers were reset. The fourth and last timer may be associated with availability of air-link resources. A Router Solicitation may be sent when the fourth timer expires for certain time periods such as nights and weekends.

The above description for FIGS. 7A through 7D, 8 and 9 is for one RA prefix. If a wireless terminal is assigned multiple RA prefixes, then the same processing may be performed for each RA prefix based on the lifetime for that RA prefix. The timer(s) for each RA prefix may be reset whenever a Router Advertisement is received with information for that RA prefix.

The wireless network may also schedule to send a Router Advertisement to a wireless terminal. The wireless network can keep track of which terminals have opened PPP sessions, which terminals are dormant when Router Advertisements are sent, and which terminals need to receive Router Advertisements when they go active. The wireless network can send a Router Advertisement to each terminal that needs to receive Router Advertisement when the terminal goes active. The wireless network does not re-establish an air-link connection to send Router Advertisement to a terminal that is dormant.

Some of the techniques described herein may also be used for IPv4. For example, a wireless network may assign an IPv4 address to a wireless terminal for a particular time duration. This time duration may be indicated to the terminal during call setup or via signaling. The techniques described above may then be used to solicit a new IPv4 address prior to the expiration of the time duration.

Figure 10:
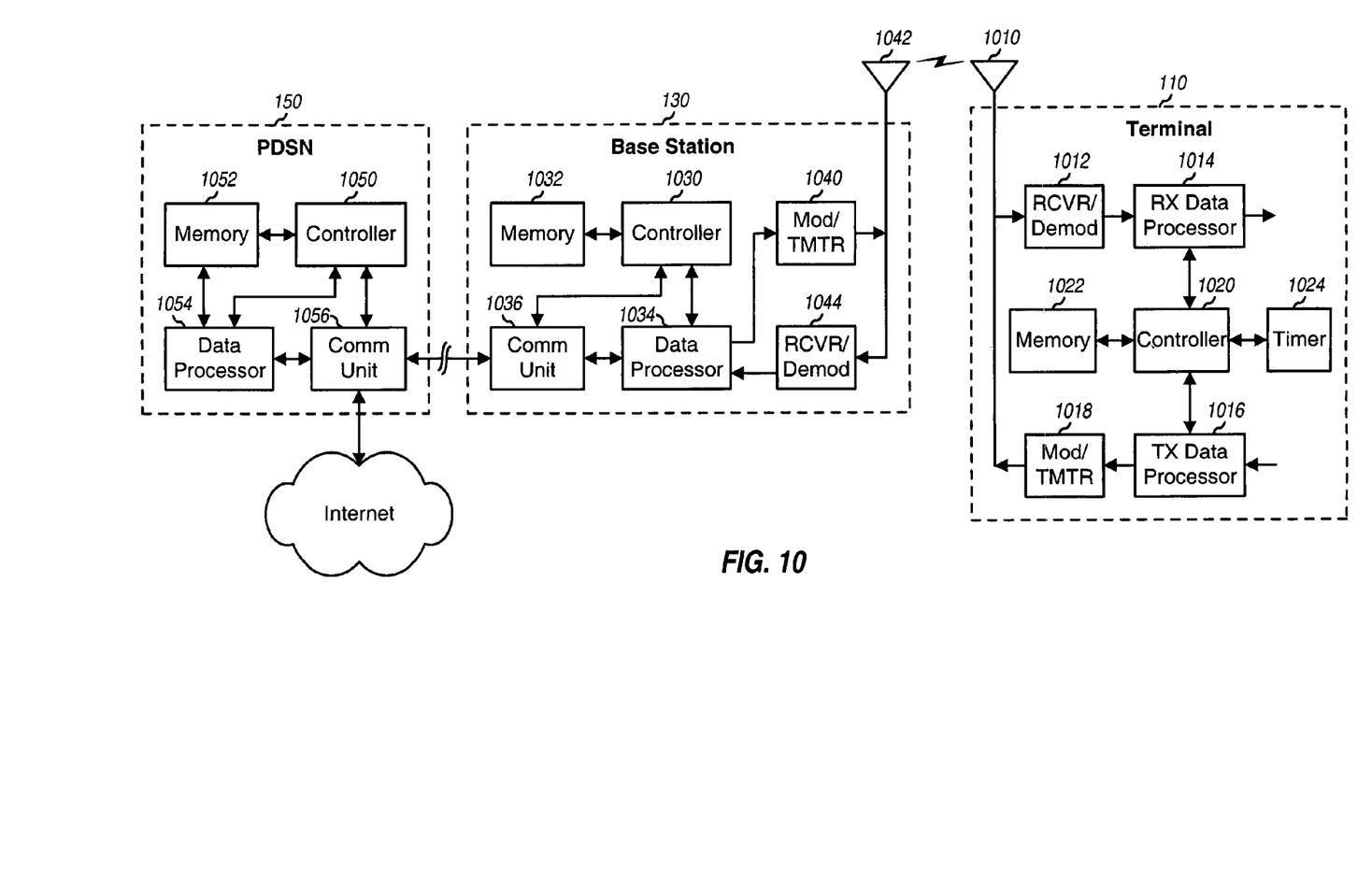
FIG. 10 shows a block diagram of various entities in the CDMA network.

FIG. 10 shows a block diagram of various entities in CDMA network 100. On the forward path, PDSN 150 may send IP packets (e.g., for a Router Advertisement) to terminal 110. A data processor 1054 receives prefix information stored in a memory unit 1052, encapsulates the prefix information in IP packets, and sends the IP packets via a communication (Comm) unit 1056 to PCF 140 (not shown in FIG. 10). PCF 140 is responsible for the communication channel between PDSN 150 and the radio network and is described in IS-835.

Within base station 130, the data from PCF 140 is received by a communication unit 1036 and processed by a data processor 1034 to generate over-the-air messages. The messages are then processed (e.g., coded, modulated, filtered, amplified, quadrature modulated, and upconverted) by a modulator/transmitter (Mod/TMTR) 1040 to obtain a forward link signal, which is then transmitted via an antenna 1042 to the wireless terminals within the coverage of base station 130.

Terminal 110 receives the forward link signal from base station 130. The received signal from an antenna 1010 is processed by a receiver/demodulator (RCVR/Demod) 1012 to recover the messages sent by base station 130. A receive (RX) data processor 1014 further processes the received messages to recover IP packets sent by PDSN 150 and extracts the prefix information contained in the Router Advertisement.

A controller 1020 receives and stores the prefix information in a memory unit 1022. Controller 1020 further computes the threshold time period(s) based on the lifetime in the prefix information and sets a timer 1024 with the threshold time period(s). Timer 1024 implements all of the timers used for soliciting Router Advertisement. Controller 1020 determines if and when a Router Solicitation needs to be sent based on the output from timer 1024 and other pertinent information (e.g., the configuration of terminal 110, past data activity, and so on). Controller 1020 initiates transmission of a Router Solicitation if necessary. The Router Solicitation is processed by a transmit (TX) data processor 1016, further processed by a modulator/transmitter 1018, and transmitted from antenna 1010.

Within base station 130, the reverse link signal from terminal 130 is processed by a receiver/demodulator 1044, further processed by data processor 1034, and forwarded via communication unit 1036 to PCF 140. PCF 140 receives and processes the data from base station 130 and forwards IP packets to PDSN 150. Within PDSN 150, the IP packets are received by communication unit 1056 and processed by data processor 1054. A controller 1050 initiates transmission of another Router Advertisement in response to the Router Solicitation received from terminal 110.

Controllers 1020, 1030, and 1050 perform various processing and control functions for terminal 110, base station 130, and PDSN 150, respectively. Memory units 1022, 1032, and 1052 store program codes and data for controllers 1020, 1030, and 1050, respectively. RX data processor 1014 and TX data processor 1016 are shown as separate units in FIG. 10 but may be implemented within one processor (e.g., one digital signal processor).

The techniques described herein may be implemented by various means. For example, these techniques may be implemented in hardware, software, or a combination thereof. For a hardware implementation, the processing units used to perform the techniques described herein (e.g., processes 800 and 900 and the four schemes shown in FIGS. 7A through 7D) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory units 1022 and/or 1052 in FIG. 10) and executed by a processor (e.g., controllers 1020 and/or 1050). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless terminal in a wireless communication system, comprising:
   a receive data processor operative to receive a first message with prefix information at a first time instant, wherein the prefix information includes a prefix used to derive an Internet Protocol (IP) address for the terminal and a lifetime for the prefix; and
   a transmit data processor operative to send a second message to solicit updated prefix information after a second time instant if a first condition is met, wherein the second time instant is a first threshold time period from the first time instant, and send the second message at a third time instant if a second condition is met, wherein the third time instant is a second threshold time period from the first time instant, wherein the first and second threshold time periods are derived based on the lifetime for the prefix and are shorter than the lifetime, and wherein the second threshold time period is longer than the first threshold time period.

2. The terminal of claim 1, wherein the first condition is met if the terminal is active.

3. The terminal of claim 1, wherein the second condition is met if the terminal is configured with an always-on data session.

4. The terminal of claim 1, wherein the second condition is met if there was data activity during the second threshold time period.

5. The terminal of claim 1, wherein the second condition is met if there is likelihood of future data activity.

6. A method of maintaining Internet Protocol (IP) connectivity for a wireless terminal in a wireless communication system, comprising:
   receiving a first message with prefix information at a first time instant, wherein the prefix information includes a prefix used to derive an IP address for the terminal and a lifetime for the prefix;
   sending a second message to solicit updated prefix information after a second time instant if a first condition is met, wherein the second time instant is a first threshold time period from the first time instant; and
   sending the second message at a third time instant if a second condition is met, wherein the third time instant is a second threshold time period from the first time instant, wherein the first and second threshold time periods are derived based on the lifetime for the prefix and are shorter than the lifetime, and wherein the second threshold time period is longer than the first threshold time period.

7. An apparatus in a wireless communication system, comprising:
   means for receiving a first message with prefix information at a first time instant, wherein the prefix information includes a prefix used to derive an Internet Protocol (IP) address for a terminal and a lifetime for the prefix;
   means for sending a second message to solicit updated prefix information after a second time instant if a first condition is met, wherein the second time instant is a first threshold time period from the first time instant; and
   means for sending the second message at a third time instant if a second condition is met, wherein the third time instant is a second threshold time period from the first time instant, wherein the first and second threshold time periods are derived based on the lifetime for the prefix and are shorter than the lifetime, and wherein the second threshold time period is longer than the first threshold time period.

8. A processor readable media for storing instructions executable on a wireless device, comprising the steps of:
   receiving a first message with prefix information at a first time instant, wherein the prefix information includes a prefix used to derive an Internet Protocol (IP) address for a terminal and a lifetime for the prefix; and
   sending a second message to solicit updated prefix information after a second time instant if a first condition is met, wherein the second time instant is a first threshold time period from the first time instant, and send the second message at a third time instant if a second condition is met, wherein the third time instant is a second threshold time period from the first time instant, wherein the first and second threshold time periods are derived based on the lifetime for the prefix and are shorter than the lifetime, and wherein the second threshold time period is longer than the first threshold time period.

9. A method of avoiding dormant reactivation to receive Internet Protocol Version 6 (IPv6) Router Advertisements in a wireless communication system, comprising the steps of:
   receiving a Router Advertisement with prefix information at a first time instant, wherein the prefix information includes a prefix used to derive an IPv6 address for a terminal and a lifetime for the prefix;
   sending a Router Solicitation to solicit updated prefix information after a second time instant if the terminal is active, wherein the second time instant is a first threshold time period from the first time instant, and send the second message at a third time instant if the terminal is in a dormant mode, wherein the third time instant is a second threshold time period from the first time instant, wherein the first and second threshold time periods are derived based on the lifetime for the prefix and are shorter than the lifetime, and wherein the second threshold time period is longer than the first threshold time period.

* * * * *